(12) United States Patent
Meiners

(10) Patent No.: US 8,429,371 B2
(45) Date of Patent: Apr. 23, 2013

(54) SYSTEM AND METHOD FOR ROBUST AND EFFICIENT FREE CHAIN MANAGEMENT

(75) Inventor: John H. Meiners, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 451 days.

(21) Appl. No.: 12/729,324

(22) Filed: Mar. 23, 2010

(65) Prior Publication Data

US 2011/0238942 A1 Sep. 29, 2011

(51) Int. Cl.
*G06F 12/00* (2006.01)
(52) U.S. Cl.
USPC .... 711/170; 711/169; 711/218; 711/E12.002; 718/104
(58) Field of Classification Search .................. 711/115, 711/170, 150, 152, 169, 217, 218, E12.001, 711/E12.002; 718/106, 104
See application file for complete search history.

(56) References Cited

U.S. PATENT DOCUMENTS

| | | | |
|---|---|---|---|
| 5,784,698 A * | 7/1998 | Brady et al. ................. | 711/171 |
| 6,098,152 A | 8/2000 | Mounes-Toussi | |
| 7,490,180 B2 | 2/2009 | Gallagher et al. | |
| 7,673,206 B2 * | 3/2010 | Conlin ........................ | 714/729 |
| 7,962,135 B2 * | 6/2011 | Cooper ...................... | 455/432.1 |
| 2004/0080998 A1 * | 4/2004 | Chang et al. .................. | 365/200 |
| 2005/0155034 A1 * | 7/2005 | Jiang et al. ..................... | 711/150 |
| 2010/0131709 A1 * | 5/2010 | Yoshida ........................ | 711/115 |

OTHER PUBLICATIONS

Evangelos P. Markatos, "On Caching Search Engine Query Results", Institute of Computer Science, Foundation for Research & Technology—Hellas (FORTH), In Proceedings of the 5th International Web Caching and Content Delivery Workshop, May 2000, 14 pages.

* cited by examiner

*Primary Examiner* — Pierre-Michel Bataille

(57) ABSTRACT

Disclosed herein are systems, methods, and non-transitory computer-readable storage media for managing free chains of compute resources. A system configured to practice the method divides a free chain of compute resources into a usable part (UP) which contains resources available for immediate allocation and an unusable part (UUP) which contains resources not available for immediate allocation but which become available after a certain minimum number of allocations. The system sorts resources in the UP by block number, and maintains a last used object (LUO) vector, indexed by block number, which records a last object in the UP for each block. Each time the system frees a resource, the system adds the freed resource to a tail of the UUP and promotes an oldest resource in the UUP to the UP. This approach can manage free chains in a manner that is both flaw tolerant and has relatively high performance.

20 Claims, 5 Drawing Sheets

SYSTEM AND METHOD FOR ROBUST AND EFFICIENT FREE CHAIN MANAGEMENT

BACKGROUND

1. Technical Field

The present disclosure relates to compute resource management and more specifically to managing free chains of compute resources such as computer memory.

2. Introduction

In a computer, the operating system and various user programs allocate and deallocate memory and other resources. Computers track which portions of memory are free using free chains. A free chain is essentially a linked list, or a chain of objects (such as portions of memory), each of which includes a pointer to the next object in the chain. For memory, the linked list includes at least one pointer within each memory location in the chain of objects which points to another memory location. Thus, an "object" in the list in the memory example of a free chain is a respective memory location and its associated pointer. A free chain can optionally include separate head and/or tail nodes or entries that do not represent an object. For example, the system could include a head node that is a pointer (i.e., no allocatable memory) that points to a first memory location.

When selecting an approach to manage free chains of memory, two opposing objectives are usually considered. The first objective is the desire to improve system performance by making efficient use of memory by using localized references. Localized references are references to objects which are temporally and/or spatially near to one another, such as in the same block of memory. Localized references improve system performance by reducing page faults, reducing swapping, and/or making caches operate more efficiently by reducing misses. A page fault is a message raised by software and sent to hardware signaling that the software is accessing a memory page that is mapped in address space but not loaded in physical memory. Properly managing locality can make up to a three-to-one difference in system performance.

The second objective with respect to managing free chains is the desire to improve system robustness by reducing the impact of programming bugs. A common programming bug occurs when a program continues to use and modify recently-freed memory. For example, consider when a pointer for object A and a pointer for object B both point to the same location in memory. If clear ownership is not established (and such establishment can be tricky), then calling the destructor for A cleans up B and vice versa. There is no problem if A cleans up B, or if B cleans up A. The problem comes if both things happen. If A cleans up B first, then B will access objects that A has already cleaned up which leads to the problem of the continued use and modification of recently-freed memory. A destructor is a routine that releases allocated memory, closes any open files, and performs general "cleanup" after a function finishes or in certain situations when a variable goes out of scope. The continued use and modification of recently freed memory can lead to computer system crashes.

A Most Recently Used (MRU) approach to managing the free chain addresses the first objective set forth above, while a Least Recently Used (LRU) approach addresses the second objective. Unfortunately, these two approaches contradict and are incompatible for simultaneous use, thus forcing an unattractive compromise between performance and robustness when managing free chains.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing free chains of compute resources. One embodiment will be described with respect to managing memory in the computer system but the concept of managing a free chain is applicable to other resources as well. A system configured to practice the method divides a free chain of compute resources into a usable part (UP) which contains resources available for immediate allocation and an unusable part (UUP) which contains resources not available for immediate allocation. The system then sorts resources in the UP by memory block number, and maintains a last used object (LUO) vector, indexed by block number, which records a last object in the UP on a block by block basis. Each time a resource is freed, such as when a portion of memory is no longer needed, the system adds the freed resource to a tail of the UUP and promotes the oldest resource in the UUP. The UUP operates as a time-based queue in which nodes or particular freed resources move through the queue over time as the system adds and promotes resources to the UP. The system sorts the UP by memory block number to maintain a physical local preference when allocating memory. Promoted resources are sorted into the UP based on their block number. The system allocates resources from the UP based on the block number in order to allocate resources having locality of reference in response to resource requests. This approach can manage free chains in a manner that is both flaw tolerant and preserves favorable performance characteristics.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
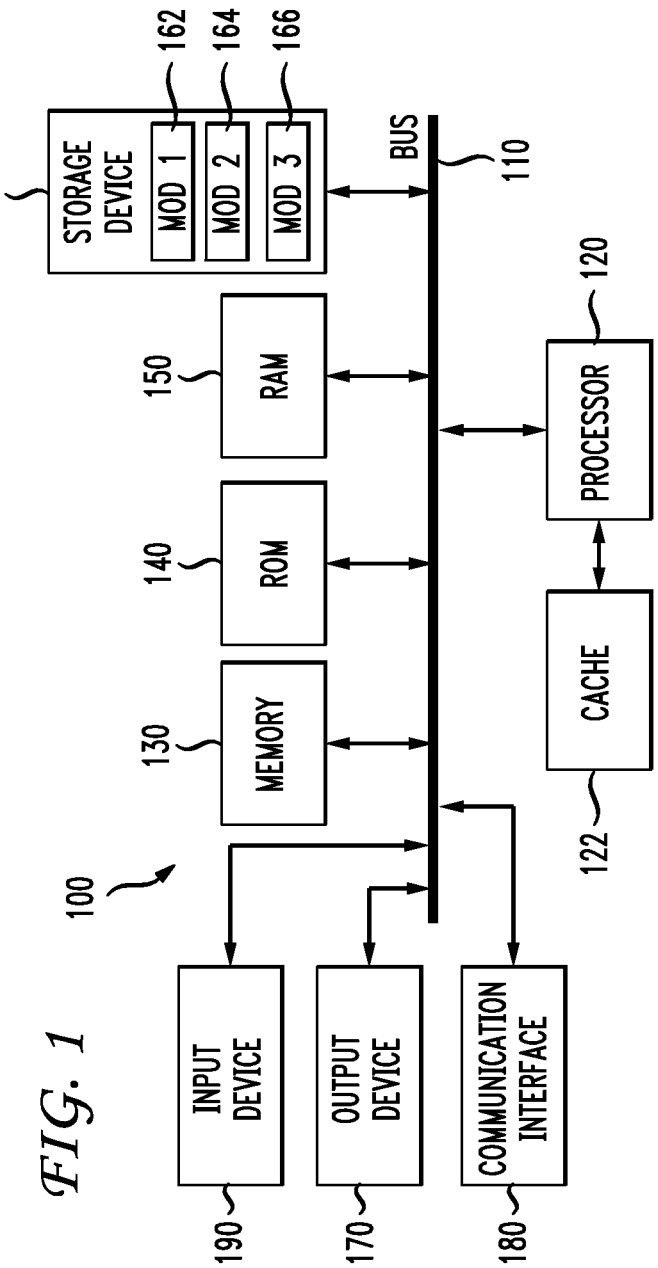
FIG. 1 illustrates an example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

This disclosure first discusses how to manage free chains and some of the reasons for managing free chains in this manner. After this initial discussion, the disclosure turns to an exemplary system embodiment. As noted above, the embodiments disclosed will apply to computer memory but can apply to any resource and modifications or variations known to those of skill in the art can be applied depending on the particular resource.

Programmers are not perfect and often create program errors or flaws when writing software. One such common programmer error occurs when a program allocates a memory location for use, later deallocates the memory, but continues to use the deallocated memory location. When the program contains this type of logic error, two entities can simultaneously try and use the same memory when the deallocated memory is reallocated to another process or program. This can cause serious problems such as system freezes and crashes or, at the very least, unpredictable or undesirable program operation.

The disclosure addresses this issue and assumes that a programmer who deallocates a memory location will possibly continue to temporarily use it. The system delays the reallocation of memory in order to reduce the chances of a conflict between the old owner and the new owner of the memory location or other resource and partially sorts free memory locations by locality before reallocating them once the delay has been satisfied. In order to be more resistant to flaws, the system can delay the reallocation of memory locations for a longer time. However, when the system delays memory reallocation for too long, the system tends to scatter the references to free memory, which creates a locality of reference performance problem. Locality of reference applies in many areas of computer science, especially cache management and memory management from swapping, for example. Typically a computer stores the most recently used memory locations in a convenient and inexpensively accessible location, such as a cache. The computer stores memory locations that have not been used for a while in a more distant location that is slower (i.e. more expensive) to access, such as main memory or a hard-disk based swap file.

If the computer could reuse the memory location immediately, then it would still be in the cache in the quick, easy, high-performance location for reuse. If the computer does not reuse an object for a long time, when the computer finally needs the object, it is expensive to reuse because the system must wait for main memory or even a hard disk drive. For example, a high end hard disk drive may have a seek time delay of 7 milliseconds and throughput of roughly 150 megabytes per second, whereas high end main memory has a latency delay of around 12 nanoseconds and maximum throughput of over 15 gigabytes per second. On-processor cache is typically lower latency and higher throughput still, although on-processor cache has a much smaller storage capacity and is much more financially costly than either main memory or hard disk drive storage.

Disclosed is a way to delay the reuse of recently freed memory locations for a limited period of time. When the computer system finally reuses freed memory locations, the computer system reuses memory locations from an area that is in the cache or the higher performance reuse area if possible. The computer system sorts freed memory locations so that when the system does reuse memory, it reuses memory of high locality (i.e. memory locations that are near each other), thereby improving the overall system performance.

The memory management approach disclosed herein can mitigate the effects of programmer errors while still providing adequate system performance. The approach also does not depend on buffer aggregation and involves a combination of techniques for managing free chains. Fundamentally, the system divides the free chain into a sorted usable part and an unusable part that is "aged" to prevent immediate reallocation of recently freed memory locations to achieve robustness. Memory in the usable part is available for allocation, while memory in the unusable part is not available for allocation until it is moved into the usable part. While the disclosure discusses memory, the same principles can also apply to other chains of compute resources.

Having disclosed some basic concepts, the disclosure turns to the exemplary system embodiment, and will then return to a discussion of memory management according to the various embodiments disclosed herein. With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible, non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
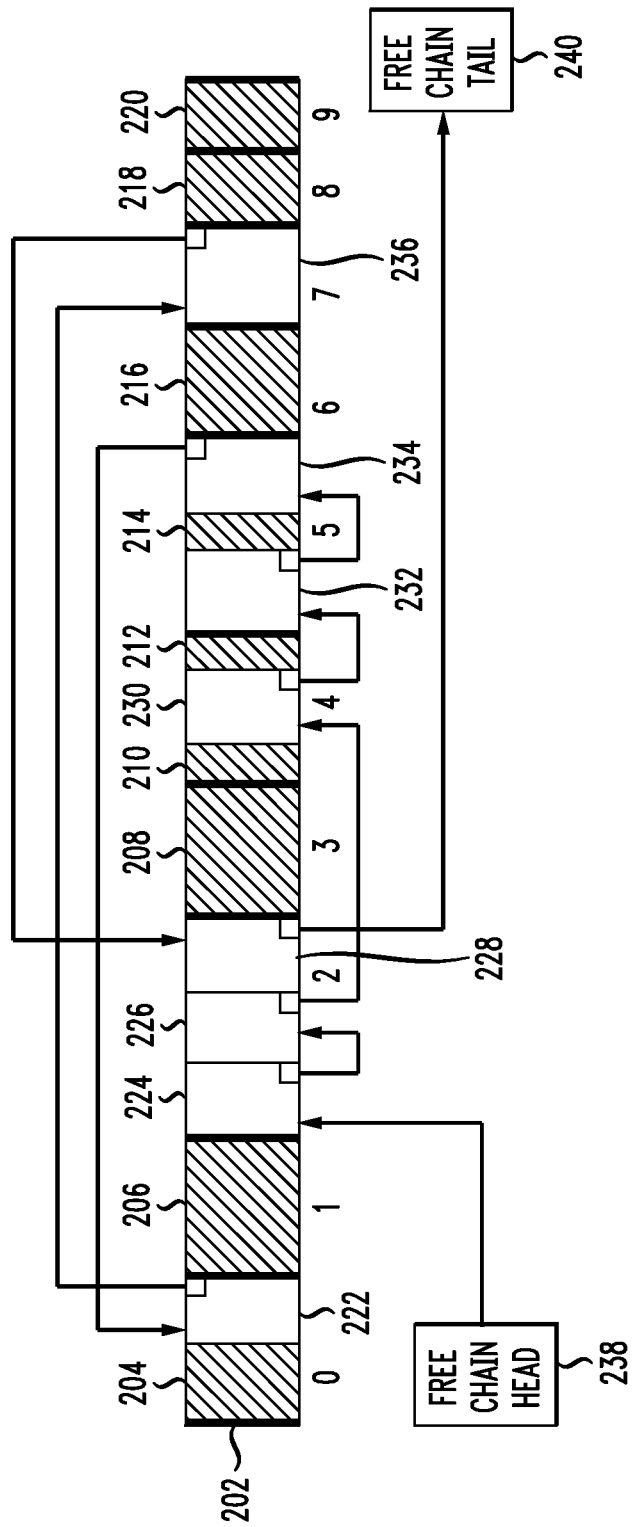
FIG. 2 illustrates an example method embodiment.

Having disclosed some basic system components and concepts, the disclosure now turns to the example free chain of memory shown as a block of memory in FIG. 2. As noted above, the embodiments are described in terms of computer memory (RAM, Cache, etc.) but the concept of managing a free chain can apply to any resource that is freed and allocated in a similar manner to memory. FIG. 2 illustrates an example free chain of memory 200 in a portion of memory 202 organized into blocks 0-9, separated by bold lines, having used or allocated memory locations 204, 206, 208, 210, 212, 214, 216, 218, 220 and free or unallocated memory locations 222, 224, 226, 228, 230, 232, 234, 236. The allocated memory locations are shaded and the unallocated memory locations are not shaded. Some blocks, such as block 1 206, block 3 208, block 6 216, block 8 218, and block 9 220 are entirely used with no free memory locations. Other blocks, such as block 2 224, 226, 228, and block 7 236 are entirely free with no used locations. Still other blocks are partially used and partially free, such as block 0 204 (used), 222 (free), block 4 210 (used), 230 (free), 212 (used), and block 5 232 (free), 214 (used), 234 (free). Thus, the free chain is the linking via pointers of the various free or unallocated memory locations in the physical memory of the computer.

The system manages the free memory locations via the free chain. Each unallocated memory location includes a pointer (the pointers are represented by small boxes in the free memory locations) which links to another unallocated memory location until the last pointer points to the free chain tail 240. The free chain 200 starts with a free chain head pointer 238 which points to a first free memory location 224. The first free memory location 224 includes a pointer that points to a second free memory location 226. The second free memory location 226 includes a pointer that points to a third free memory location 230. The third free memory location 230 includes a pointer that points to a fourth free memory location 232. The fourth free memory location 232 includes a pointer that points to a fifth free memory location 234. The fifth free memory location 234 includes a pointer that points to a sixth free memory location 222. As this sixth free memory location 222 illustrates, the free memory locations in the chain do not necessarily occur in a sequential order. The sixth free memory location 222 includes a pointer that points to a seventh free memory location 236. The seventh free memory location 236 includes a pointer that points to an eighth free memory location 228. The eighth free memory location 228 can be the free chain tail, or it can include a pointer that points to the free chain tail 240.

Figure 3:
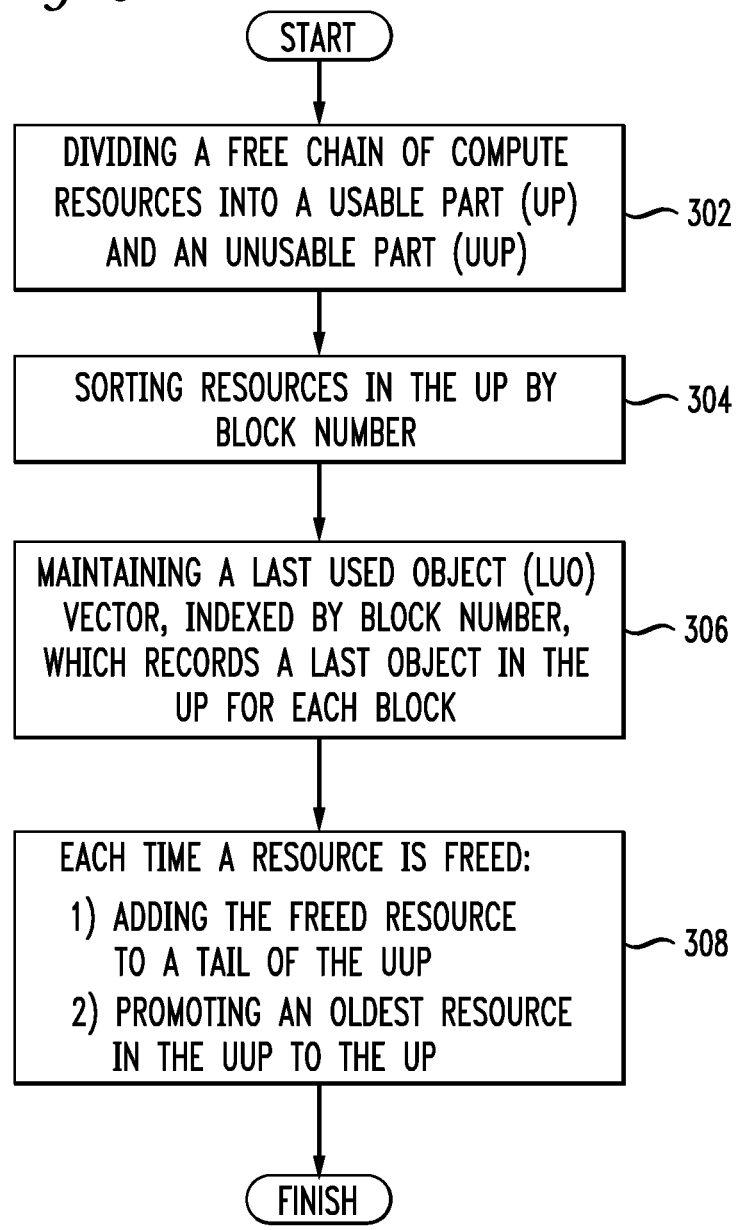
FIG. 3 illustrates an example free chain in a block of memory.

FIG. 3 illustrates an exemplary method embodiment for managing free chains of compute resources, such as memory or cache. For the sake of clarity, the disclosure discusses the method in terms of an exemplary system 100 such as is shown in FIG. 1 configured to practice the method. The approach does not operate in the event of a cache "miss"; it minimizes the number of misses before they occur while retaining robustness against programmer errors.

A system 100 divides a free chain of memory into a usable part (UP) and an unusable part (UUP) (302). In one aspect, the UP contains free memory locations available for immediate allocation and the UUP contains free memory locations not yet available for allocation. The size of the UP can be equal to the total size of the free chain minus the size of the UUP. The size of the UUP can be set according to a free list minimum size (FLMS). The FLMS defines a minimum size of the UUP. The FLMS can be statically set to a value such as 3 or 10 or the FLMS can be dynamically set, such as to a percent of the overall free memory. A dynamic FLMS value can be a percentage of the free chain such as 15% of the number of free memory locations in the free chain, 10% of the combined size of the free memory locations in the free chain, or can be dynamic based on other variables or parameters including user input. Various data points can be received and applied to evaluate a dynamically changing FLMS. A higher value for FLMS provides higher robustness, whereas a lower value for FLMS provides higher performance. Other mechanisms for statically and/or dynamically defining the size of the FMLS are contemplated as within the scope of this disclosure.

The system 100 then sorts memory in the UP by block number (304), as shown in FIG. 2 above, and maintains a last used object (LUO) vector. The LOU vector is indexed by block number and records a last object in the UP for each block (306) or on a block by block basis. Sorting memory in the UP by block number is much faster than sorting memory by its actual address. Further, sorting by block number keeps memory locations that are physically close to other near each other on the UP and in allocation order. The free chain can include a head pointer, a tail pointer, and a pointer to identify a last memory location in the UP or the first memory location in the UUP. The UP of the free chain is sorted by block number and does not necessarily sort free resources below the block level, typically for speed reasons, but the system can sort memory locations below the block level if needed. The UUP of the free chain is a queue in which freed memory locations start at the end and move their way through the queue as the oldest objects in the UUP are sorted into the UP.

Each time a memory location is freed, the system 100 (1) adds the freed memory location to a tail of the UUP and (2) promotes an oldest memory location in the UUP to the UP (308). The system 100 can promote the oldest memory location in the UUP to the UP by determining a block number of the oldest memory location in the UUP, promoting the oldest memory location to a position in the UP after the last used object for that block number, and adjusting the LUO vector entry to identify the promoted memory location. The system 100 can also promote the oldest memory location in the UUP to the UP by sorting the oldest memory location in the UUP into its proper location in the UP based on the LUO vector. In one aspect, the system transfers memory locations from the UUP to the UP after the memory locations "age" to a robustness threshold, meaning that they remain in the UUP for a certain period of time. When the system transfers memory locations from the UUP to the UP or at some other time, the system 100 can examine blocks nearby the transferred memory location to determine if any blocks are combinable. For example, if the UP contains two separate but contiguous memory locations, the system can combine the two contiguous memory locations into a single memory location and rearrange the free chain as necessary. This step is optional and can be performed on some periodic basis or based on a threshold. One example threshold is more than a certain number of memory locations in the UP from a single block.

In another aspect, the system 100 adds buffers to the free chain in blocks when the supply of objects on the free chain would otherwise drop below the free list minimum size (FLMS). The block size can be a multiple of a locality unit, such as a memory page or a cache line or other convenient size. When the system 100 receives a request to allocate memory from the free chain, the system 100 can respond to the request by allocating and thus removing a first suitable memory location from the UP of the free chain.

Figure 4:
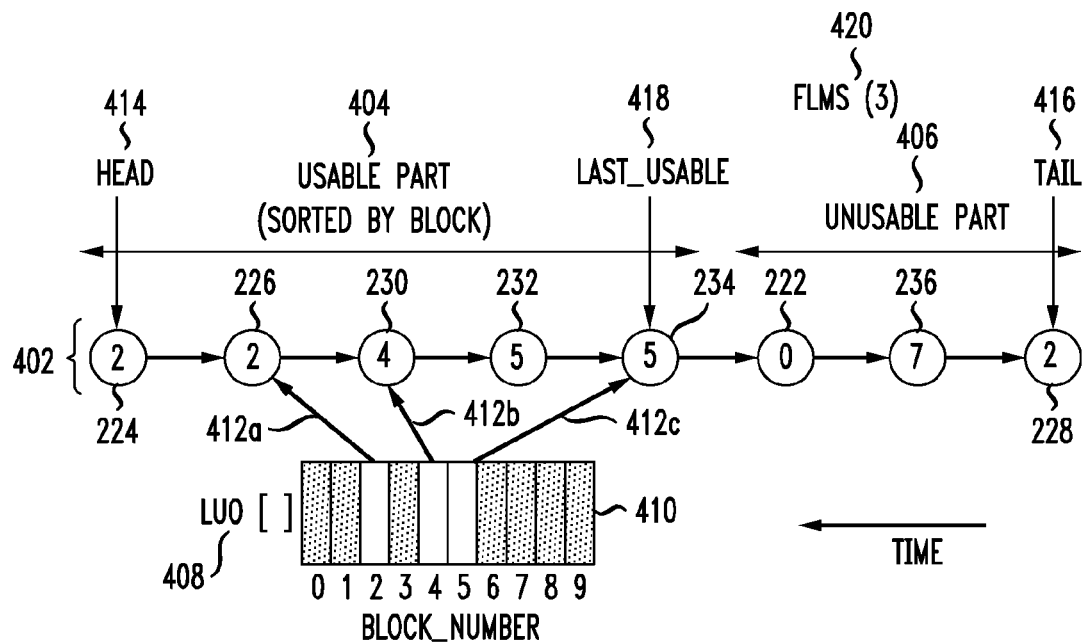
FIG. 4 illustrates an example approach to robust and efficient free chain management.

FIG. 4 illustrates an example approach 400 to robust and efficient free chain management implementing the method outlined in FIG. 3 and using the arrangement of allocated and unallocated memory in the free chain 200 shown in FIG. 2. The numbers shown inside the circles are the block numbers of the respective objects. For example, object 224, 226, and 228 are located in block 2, object 230 is located in block 4, and so forth. FIG. 4 shows the free chain 402 of memory locations of FIG. 2 identified by block number, but without the exact locations in memory. The free chain 402 illustrates, for ease of understanding and discussion, a linear version of the actual free chain in memory of FIG. 2. As a program or the system release memory for use in other application, such new memory (as an object which includes the memory and optionally a pointer) is inserted in the UUP 406 to the right of the tail 416 and then become the new tail. The oldest object in the UUP 406, in this case object 222, is then moved into a sorted position in the UP 404 as shall be explained in more detail below. For example, block 2 contains three free objects representing memory locations in the free chain 402. Objects 224, 226 are in the UP 404 and object 228 is in the UUP 406 as the tail. Note that this configuration corresponds to FIG. 2, where block 2 has three free memory locations 224, 226, 228. In this example, the compute resources are memory, but can be other compute resources as well.

A system such as system 100 shown in FIG. 1 can practice the concepts discussed herein. The system 100 divides the memory free chain 402 into a usable part (UP) 404 and an unusable part (UUP) 406. The system 100 sorts the UP 404 by block number. The UUP 406 is not sorted; it is a queue (first in, first out) which holds unusable free memory locations until they "age" a specific minimum duration dictated by the free list minimum size (FLMS). In this example, the FLMS is 3, thus the UUP 406 holds only three objects contained within blocks 0 222, 7 236, and 2 228. The object in block 0 222 has been in the UUP 406 the longest time, followed by the object in block 7 236 and the most recently inserted object in block 2 228.

In order to facilitate efficient sorting, the system 100 maintains a vector called the "last_usable_object" (LUO) vector 408, indexed by block number, that records the last object in the UP 404 for each block. The memory management approach disclosed herein can be practiced without using the LUO vector, but with the LUO vector the system can improve performance in some environments. Feature 410 represents the entries in the LUO vector. For example, the LUO vector contains a pointer 412a that points to the last free object 226 in the UP 404 for block 2. Although the UUP 406 contains yet another free object 224 in block 2, the LUO vector 408 only manages free objects in the UP 404 and not in the UUP 406. Pointers 412b, 412c point to their respective last free objects in blocks 4 and 5. The number in each circle shows the block number of each free memory location in the free chain. The LUO vector 408 does not contain information regarding objects in blocks 0, 1, 3, 6, 7, 8, 9 (shaded portions) because the UP 404 does not contain any objects in those blocks. Null pointers in the LUO vector can represent blocks which do not have free objects in the UP 404. The free list management also uses a "head'" pointer 414, a "tail" pointer 416 and a "last_usable" pointer 418 to identify the last object in the UP 404. Thus, the UUP 406 is sorted by time from right to left and the UP 404 is sorted by block number.

When the system 100 receives a request to allocate a new object, the system 100 pops an object off the front of the UP 404 of the free chain 402. The head 414 is the front of the UP 404, so in FIG. 4, the head 414 is popped off in response to the request to allocate a new object (i.e. a request for memory), and the system 100 sets the next object 226 in the free chain as the new head 414. When the system 100 frees an object, it is added to the end of the UUP 406 (after the tail 416) and becomes the new tail. This process is shown in more detail in FIGS. 5A-5C.

One way to allocate memory in C++ is with the "new" command. For example, the code int *intPtr;
    intPtr=new int(42);

allocates a new integer variable and initializes it with the value 42. The system 100 in this example pops a free memory location off the free chain in response to the program's request for a new integer variable. The program requesting the newly allocated memory can then use, refer to, and change that variable. That space of memory belongs to the requesting program. When the program is through with that memory, it can deallocate the variable, releasing ownership back to the system. One way to deallocate variables in C++ is with the delete command. For example, the code delete intPtr;

deallocates the integer variable. The system 100 pushes the recently freed memory location back onto the free chain at the end of the UUP 406. The system 100 can call a destructor, if any, before the pushing the recently freed memory location back onto the free chain.

Figure 5A:
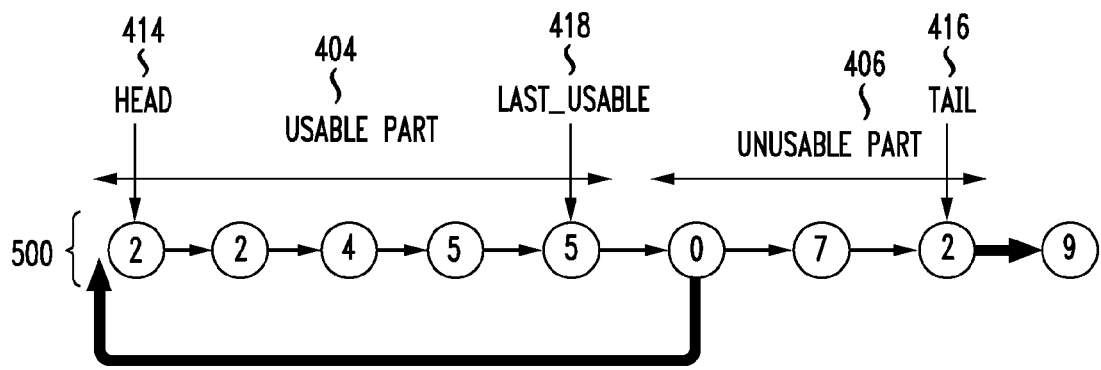
FIG. 5A illustrates an example of inserting a recently freed object in the free chain depicted in FIG. 4.

FIG. 5A illustrates an example of the operations involved in inserting a recently freed object in block (9) in the free chain 500. When an object such as the object in block (9) is freed or deallocated, the system 100 takes the following steps to insert the freed object into the free chain 402. The system 100 adds the freed object after the tail 416 of the UUP 406. The structure of the UUP 406 ensures proper aging of at least free list minimum size (FLMS) 420 allocations, in this case 3. In other words, if the minimum size is 3, the freed object "ages" or remains in the UUP 406 at least 3 deallocation operations before it progresses through the UUP 406 queue from right to left and is made available for allocation by inserting the freed object into the UP 404. The UUP can alternatively queue items from left to right, but the examples shown herein are right to left.

The FLMS 420 can be determined automatically or manually by a system designer. This parameter determines the tradeoff between performance and robustness, so a designer can place the tradeoff wherever he or she desires. He can adjust the value up for more robustness or down for improved performance. The designer or a dynamic algorithm can adjust the minimum size 420 someplace in the middle that provides the desired mix of benefits of both performance and robustness. In one aspect, a dynamic algorithm determines where to set FLMS 420 based on the author of currently running programs. For example, if a new or inexperienced programmer's code is running, the system 100 can set a high FLMS value because an inexperienced programmer is statistically more likely to generate code with these types of flaws. Also, the system 100 can profile different programmers' code and determine which programmers' code is more likely to include memory reference errors and adjust the minimum size 420 accordingly. In some aspects, a combination of manual and automatic approaches sets the value for the minimum size 420. For example, a system designer can set a range of acceptable minimum size values and a set of threshold triggers to change automatically the minimum size to different values within that range. The system 100 can also review data regarding system resources, current performance, historical performance and/or predicted performance and adjust the FLMS value accordingly.

The disclosure returns to FIG. 5A. The system 100 promotes the oldest object in block (0) in the UUP 406 to the UP 404 by sorting it into its proper location using the LUO vector. The system 100 places the oldest object in block (0) from the UUP 406 into its proper location by determining the block number of the object to be promoted, inserting the promoted object based on the LUO vector entry for that block, and readjusting the LUO vector entry to identify the newly-promoted object. In FIG. 5A, the object in block (9) is inserted into the end of the UUP 406, the FLMS is 3, so the oldest object in block (0) is sorted to its proper position at the head 414 of the UP 404. The system also updates the LUO vector 506 to point to the object in block (0) as the last used object for block 0. The updated LUO vector 506 is shown in FIG. 5B.

Figure 5B:
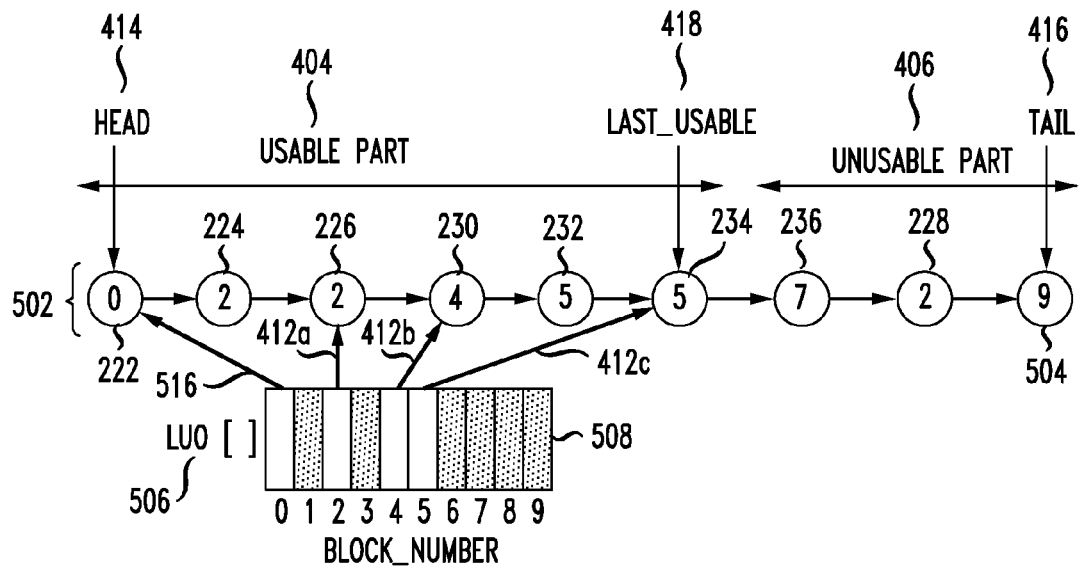
FIG. 5B illustrates the free chain after inserting the recently freed object.

FIG. 5B illustrates the free chain 502 after popping the oldest object 222 from block (0) from the UUP 406, and inserting object 222 from block (0) into the UP 404. The object 222 from block (0) becomes the new head 414 of the UP 404 because it has the lowest block number in the UP 404 and recently freed object 504 from block (9) becomes the new tail 416 of the UUP 406. The UUP 406 remains a constant size based on the FLMS of 3, and the UP 404 increases by one. The system 100 updates the LUO vector 506 to include a pointer 508 for block 0 that points to object 222 from block (0) because it is now in the UP 404.

With reference to FIG. 5B, the disclosure next discusses several more examples to further illustrate the interplay between the UP 404 and the UUP 406 as new objects are freed. If another recently freed object is inserted (not shown) at the end of the UUP 406, the oldest object in the UUP 406 is then object 236 from block (7). The system removes object 236 from block (7) from the UUP 406 and sorts it into its proper place in the UP 404 based on its block number and accordingly updates the LUO vector 506 to include a pointer to object 236 for block 7. Because object 236 is in a higher block number than object 232, the system inserts object 236 at the end of the UP 404 and object 236 becomes the new last_usable 418 object. If a third recently freed object is inserted at the end of the UUP 406, the oldest object in the UUP 406 is object 228 in block (2). The system 100 removes object 228 from the UUP 406 and sorts it into the UP 404, updating the LUO vector 506 if needed. The system 100 can insert the object 228 in block (2) before, in the middle of, or after objects 224, 226 already in the UP 404 which are also in block (2), as long as the UP 404 remains sorted by block number. The UUP 406 is a queue based on time and the UP 404 can be sorted in a variety of ways based on block number. Freed objects move through the UUP 406 queue and when the freed objects reach the front of the queue, the system 100 sorts them into the UP 404 by block number.

Figure 5C:
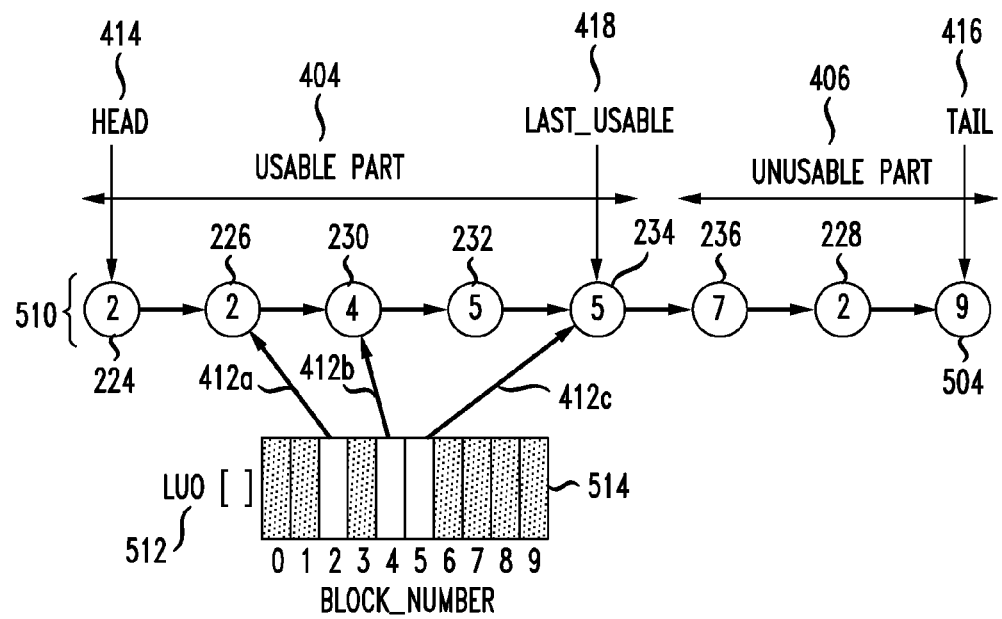
FIG. 5C illustrates the free chain after allocating an object from the free chain.

FIG. 5C illustrates the free chain 510 after allocating an object from the free chain 502 shown in FIG. 5B. To allocate an object, the system 100 removes object 222 in block (0) at the head 414 of the free list 502 and updates the LUO vector 512 with the respective data 514. Object 222 is within block (0), or the lowest block number, thus being in the same locality of memory as other recently allocated objects. The system 100 sets the next object 224 in block (2) in the free list as the new head 414 of the free chain 510. In this transaction, since no recently freed objects are being added to the free chain 510, the UUP 406 remains unchanged. As can be seen, if another request for memory was received, then the next allocation from the UP 404 would be for object 224 in block (2) which is physically close to the previously allocated object 222 from block (0). With reference to FIG. 2, the example just given causes the last two memory allocation requests to have object 222 from block 0 allocated followed by object 224 from block 2. These are physically close in memory 202.

One consideration in the application of this approach is how the performance of the free chain management algorithm is tied to the overall system performance. If the process of allocating and deallocating objects is sufficiently inexpensive, then the additional free chain management overhead in the system 100 is made up for by the improved memory management performance and robustness. Various complexity levels of the algorithm can provide differing levels of performance improvement for the system as a whole while incurring differing amounts of processing, memory, and other compute resource overhead. The approach outlined herein is designed to be efficient enough that it is a very small increase in the cost of allocation and de-allocation in order to gain a much larger increase in the overall system performance and robustness.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein may be applied to flash memory, traditional computer memory, hard disk drive storage, bandwidth, cache, processor branch prediction, and so forth. For example, if the free chain concept is applied to resources other than memory, then the indexing identified above to the block number can be exchanged for some other aspect of the resource that the system can use for indexing. The concept of a free chain of "object" can apply to any other situation with locality of reference issues and any resource or set of resources that has two different sets of access performance characteristics, such as an inexpensive close-at-hand resource and an expensive distant resource, especially where recently used resources are cheaper to use and less recently used resources are more expensive to use. In such cases, the concepts of resources, memory, pointers, block numbers and so forth would transfer to and be the equivalent of appropriate terms that would apply for disk drive storage, or bandwidth, and so forth. Those skilled in the art will readily recognize various modifications and changes that may be made to the principles described herein without following the example embodiments and applications illustrated and described herein, and without departing from the spirit and scope of the disclosure.

I claim:

1. A system comprising:
   a processor; and
   a computer-readable storage medium having stored therein instructions which, when executed by the processor, cause the processor to perform a method comprising:
      dividing a free chain of compute resources into a usable part and an unusable part;
      sorting resources in the usable part by block number;
      maintaining a last used object vector, indexed by block number, which records a last object in the usable part for each block; and
      each time a resource is freed, adding the resource to a tail of the unusable part and promoting an oldest resource in the unusable part to the usable part.

2. The system of claim 1, wherein the usable part contains resources available for immediate allocation and the unusable part contains resources not available for immediate allocation.

3. The system of claim 1, wherein a size of the usable part is equal to a total size of the free chain of compute resources minus a fixed size of the unusable part.

4. The system of claim 1, wherein a size of the unusable part is equal to a free list minimum size.

5. The system of claim 1, wherein the computer-readable storage medium stores additional instructions which result in the method further comprising transferring resources in the unusable part to the usable part after the resources age to a robustness threshold.

6. A method comprising:
   dividing a free chain of compute resources into a usable part and an unusable part;
   sorting resources in the usable part by block number;
   maintaining a last used object vector, indexed by block number, which records a last object in the usable part for each block;
   each time a resource is freed, 1) adding the resource to a tail of the unusable part; and
2) promoting an oldest resource in the unusable part to the usable part.

7. The method of claim 6, wherein the usable part contains resources available for immediate allocation and the unusable part contains resources not available for immediate allocation.

8. The method of claim 6, wherein a size of the usable part is equal to a total size of the free chain of compute resources minus a fixed size of the unusable part.

9. The method of claim 6, wherein a size of the unusable part is equal to a free list minimum size.

10. The method of claim 6, further comprising transferring resources in the unusable part to the usable part after the resources age to a robustness threshold.

11. The method of claim 6, further comprising adding buffers to the free chain of compute resources in blocks when a supply of objects on the free chain of compute resources would otherwise drop below a free list minimum size.

12. The method of claim 11, wherein block size is a multiple of a locality unit.

13. The method of claim 6, wherein promoting the oldest resource in the unusable part to the usable part further comprises:
determining a block number of the oldest object;
promoting the oldest resource to a position in the usable part after the last used object for the block number, to yield a promoted resource; and
adjusting the last used object entry to identify the promoted resource.

14. The method of claim 6, wherein the free chain of compute resources comprises a head pointer, a tail pointer, and a pointer to identify a last resource in the usable part.

15. The method of claim 6, wherein promoting the oldest resource in the unusable part to the usable part further comprises sorting the oldest resource in the unusable part into its proper location in the usable part based on the last used object vector.

16. The method of claim 6, further comprising allocating a resource from the free chain of compute resources by removing a topmost resource from the usable part of the free chain of compute resources.

17. A non-transitory computer-readable storage medium storing instructions which, when executed by a processor, cause the processor to perform a method further comprising:
dividing a free chain of compute resources into a usable part and an unusable part;
sorting resources in the usable part by block number;
maintaining a last used object vector, indexed by block number, which records a last object in the usable part for each block; and
each time a resource is freed,
1) adding the resource to a tail of the unusable part; and
2) promoting an oldest resource in the unusable part to the usable part.

18. The non-transitory computer-readable storage medium of claim 17, storing additional instructions which result in the method further comprising adding buffers to the free chain of compute resources in blocks when a supply of objects on the free chain of compute resources would otherwise drop below a free list minimum size.

19. The non-transitory computer-readable storage medium of claim 18, wherein block size is a multiple of a locality unit.

20. The non-transitory computer-readable storage medium of claim 17, wherein promoting the oldest resource in the unusable part to the usable part further comprises:
determining a block number of the oldest object;
promoting the oldest resource to a position in the usable part after the last used object for the block number, to yield a promoted resource; and
adjusting the last used object entry to identify the promoted resource.

* * * * *